350-96.24 SR

XR 3,757,127

SEARCH ROOM

United States Patent [11] 3,757,127

Dhaka [45] Sept. 4, 1973

SUBSTITUTE FOR MISSING XR

[54] PHOTODETECTOR PACKAGING ASSEMBLY

[75] Inventor: Vir A. Dhaka, Hopewell Junction, N.Y.

[73] Assignee: Cogar Corporation, Wappingers Falls, N.Y.

[22] Filed: Aug. 10, 1970

[21] Appl. No.: 62,298

[52] U.S. Cl. ............. 250/227, 250/220 M, 250/239

[51] Int. Cl. ............................................. G02b 5/16

[58] Field of Search ......... 250/227, 219 D, 219 DC, 250/211 J, 209, 239, 220 M; 317/235 N; 350/96 B

[56] References Cited

UNITED STATES PATENTS

| | | | |
|---|---|---|---|
| 2,899,659 | 8/1959 | McIlvane | 250/220 X |
| 3,423,594 | 1/1969 | Galopin | 250/227 X |
| 3,188,475 | 6/1965 | Miller | 250/219 DC X |
| 3,082,327 | 3/1963 | Rice | 250/220 M |
| 3,535,532 | 10/1970 | Merryman | 250/211 J X |
| 3,110,816 | 11/1963 | Kaisler et al. | 250/227 |
| 3,211,912 | 10/1965 | Schwarz | 250/220 M |

*Primary Examiner*—Walter Stolwein
*Attorney*—Harry M. Weiss

[57] ABSTRACT

A photodetector assembly includes a slice of semiconductive material having a photodetector array formed thereon. The slice is supported on a substrate. A fiber optics bundle is closely spaced and coupled optically to the devices of the array.

In one embodiment, the substrate is apertured. Contacts space the slice from the substrate with the array positioned over the aperture. The bundle extends into the aperture, terminating at the surface of the substrate. In another embodiment the slice is bonded to a depression in the substrate with the array facing away from the substrate. An apertured cap is mounted over the substrate, with the bundle extending into the aperture.

1 Claim, 4 Drawing Figures

PATENTED SEP 4 1973 3,757,127

INVENTOR
VIR DHAKA
BY Joseph L. Spiegel
Harry M. Weiss
ATTORNEYS

PHOTODETECTOR PACKAGING ASSEMBLY

BACKGROUND OF THE INVENTION

1. Field of the Invention

This invention relates to optical packaging and, in particular, to photodetector packaging. It is specifically directed toward making microelectronic semiconductive photoresponsive devices compatible with fiber optics.

2. Description of the Prior Art

In the packaging assembly characteristic of the prior art, a photoresponsive element of some type is mounted on a supporting means or substrate, with the active regions of the elements facing away from the supporting means. When light impinges on the element or elements which, by way of illustration, can be phototransistors, photodiodes and/or light sensitive resistors, photocurrent is generated or there is some change in the current.

The difficulty with these prior art assemblies is that optical energy from the ambient impinges upon the elements as well as the light signals whose response one is attempting to obtain.

SUMMARY OF THE INVENTION

Accordingly, an object of the invention is an efficient photodetector packaging assembly.

Another object is a photodetector packaging assembly employing microelectronic semiconductive photoresponsive devices.

Still another object is a photodetector packaging assembly in which flip-chip joining techniques are made compatible with fiber optics.

These and other objects are accomplished in accordance with the present invention which comprises a photodetector packaging assembly that includes a slice of semiconductive material supported on a substrate. The slice includes a photodetector array formed thereon. A fiber optics bundle is closely spaced and coupled optically to the devices of the array.

In one embodiment, the preferred embodiment, the substrate contacts space the slice from the substrate with the array positioned over the aperture. The bundle extends into the aperture, terminating at the surface of the substrate. In another embodiment, the slice is bonded to a depression in the substrate with the array facing away from the substrate. An apertured cap is mounted over the substrate, with the bundle extending into the aperture.

DESCRIPTION OF THE DRAWING

The foregoing and other objects, features and advantages of the invention will be apparent from the following, more particular description of the preferred embodiments of the invention, as illustrated in the accompanying drawing wherein.

DESCRIPTION OF THE PREFERRED EMBODIMENTS

Figure 1:
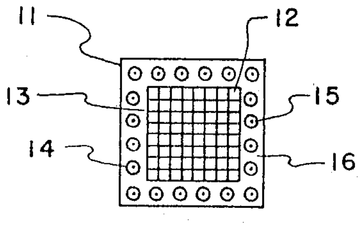
FIG. 1 is a bottom view showing the active (underside) face of a slice of semiconductive material.

Referring now to FIG. 1, there is shown a slice of semiconductive material 11. The slice is typically a component hermetically sealed by glass including a plurality of photoresponsive devices 12 formed on the bottom face of the slice 11. The devices 12 are so arranged to form a photoconductive array 13.

The slice further includes a plurality of terminal areas 14 electrically interconnected to the array 13 through metallization means (not shown). Solder contacts 15 are attached to the terminal areas 14 through openings in a glass layer 16 covering the face of the chip 11. In a typical embodiment the slice 11 is 125 × 125 mils while the photoconductive array 13 occupies an area of 90 × 90 mils on the surface of the device 11.

Additionally, the slice includes a plurality of amplifiers formed thereon (not shown) for amplifying the signals from the respective devices 12 of the photoconductive array 13 to external circuitry. Decoder circuits can also be part of the chip.

Figure 2:
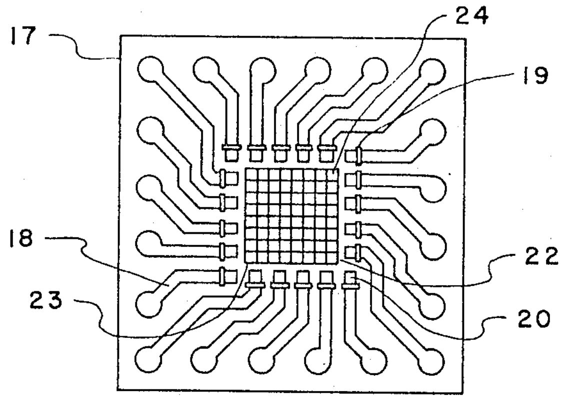
FIG. 2 is a top view of a substrate to which the semiconductive slice of FIG. 1 is to be joined.
Figure 3:
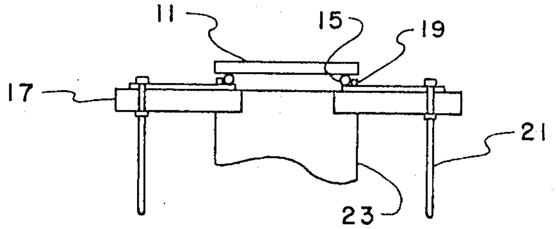
FIG. 3 is a side sectional view illustrating the photodetector packaging assembly obtained joining the semiconductive slice of FIG. 1 to the substrate of FIG. 2; and, FIG. 4 is a side sectional view illustrating an alternate embodiment of a photodetector packaging assembly constructed in accordance with the teachings of the present invention.

FIG. 2 illustrates the substrate 17 to which the slice 11 is to be joined. Typically the substrate is of dielectric material such as aluminum oxide, beryllium oxide, etc.

The substrate has a conductive electrode pattern 18 formed on its surface. The pattern 18 is formed by well known techniques, such as photoetching a metal clad printed circuit board, silk screening or otherwise printing a pattern on the substrate 17 after proper preparation of the substrate surface. In a typical embodiment the pattern is formed by depositing a silver-palladium vitreous frit in the desired pattern 18 and firing same.

Subsequently a pattern 19 of material is applied over the conductive pattern 18. This pattern 19 is not wettable with solder and thereby defines connecting areas 20 which are completely surrounded by not-wettable-by-solder regions. The material of pattern 19 does not have to be conductive and can be, for example, a glass frit or a polymeric material which is not wettable by the solder material. The material can be printed by any conventional technique in the desired pattern, dried, and fired, if necessary.

The substrate 17 is of the order of ½ inch square × 0.06 inch thick and has terminal members 21 pressed or embedded therein. The conductive electrode pattern 18 extends from the connecting areas 20 to the terminal members 21 and in this way can link the to-be-joined slice of semiconductive material 11 to external circuitry.

The substrate 17 also has a large aperture 22. Aperture 22 may be pressed into the substrate at the same time that the openings for terminal members 21 are formed, and is located centrally of the connecting areas 20.

A fiber optics bundle 23 including a plurality of fiber optic elements 24 is disposed in the aperture 22 such that the ends of each element 24 terminate at the surface of the substrate 11. The bundle 24 is bonded to substrate 17, as with epoxy cement.

The elements 24 of the fiber optics bundle 23 are each brought is to alignment with a device 12 of the photoconductive array 13 thereby completing the assembly.

Prior to this, the solder contacts 15 of slice 11 are placed in registry with the connecting areas 20 of substrate 17. The substrate 17, slice 11 and contacts 15 are heated to a temperature and for a time sufficient to soften the solder. The substrate is cooled at the end of the heating cycle to completely solidify the solder contacts 15.

In the previous discussion, a solder reflow technique was used for joining slice 11 to substrate 17. The invention is not limited to that technique, and thermocompression or ultrasonic bonding could be employed. The solder reflow technique, however, more readily lends itself to precise alignment of array to bundle elements.

In the event the substrate used is transparent, such as glass, the bundle or some other light directing means could be bonded to the glass and no aperture would be required.

Additionally, in the event some other light directing means was used, it could be bonded to the substrate beneath the chip 11.

Figure 4:
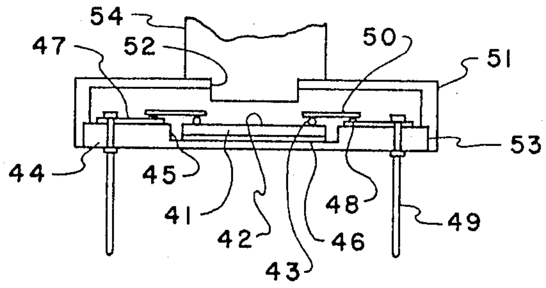

Referring to FIG. 4 there is shown an alternate embodiment of the packaging assembly of the present invention. A slice of semiconductive material 41 includes a photoconductive array 42. The slice further includes a plurality of terminal areas 43 interconnected to the array.

The slice 41 is supported on a substrate 44 of dielectric material. The substrate 44 is preferably provided with a depression 45 with the slice 41 being placed in the depression 45. The slice 41 is bonded to substrate 44 by a metallization layer 46 formed at the bottom of depression 45.

Substrate 44 has a conductive electrode pattern 47 including connecting areas 48 formed on its surface. The substrate 44 also has terminal members 49 pressed or embedded therein. Pattern 47 extends from connecting areas 48 to terminal members 49.

To interconnect slice 41 electrically to external circuitry, wires 50 are laid between each terminal area and its corresponding connecting area 48. A bond is then established, either by ultrasonic or thermocompression means, first between wires 50 and connecting areas 48 and then between wires 50 and terminal areas 43.

A cap 51, apertured at 52, and typically of thermallly conductive material such as copper, is placed over substrate 44 and secured thereto as by crimping its sides against substrate 44 at 53.

A fiber optics bundle 54 is disposed in aperture 52 with its elements in close proximity to the devices of array 42. The bundle 54 is bonded to the cap 51, as with epoxy cement.

The cap 51, besides positioning the bundle 54 closely and precisely with respect to array 42, keeps out stray light from the ambient.

In the previous discussion two embodiments of a photodetector packaging assembly of extremely efficient and simple design have been described. Both permit employment of microelectronic semiconductive photoresponsive devices. In both an optical signal may be decoded to bring out an electrical signal.

While the invention has been particularly shown and described with reference to a preferred embodiment thereof, it will be understood by those skilled in the art that other changes in form and detail and omissions may be made therein without departing from the spirit and scope of the invention.

What is claimed is:

1. A photodetector packaging assembly comprising:
a dielectric substrate;
a slice of semiconductive material supported on said substrate, said slice including a photodetector array located thereon, said photodetector array having a plurality of photoresponsive elements,
a fiber optics bundle comprising optic elements being closely spaced and optically coupled to said photodetector array, each of said elements of said fiber optics bundle being in alignment with one of said photoresponsive elements of said photodetector array,
means for positioning said slice with respect to said fiber optics bundle to permit each of said fibers of said fiber optics bundle to be in alignment with one of said photoresponsive elements of said photodetector array, said means comprising solder means for connecting said slice to said substrate and for aligning elements of said photoresponsive elements to respective fibers of said elements optics bundle,
said substrate being apertured, said semiconductive slice being spaced from said substrate over said aperture with said array positioned over and facing said aperture and said bundle extending into said aperture.

* * * * *